(12) United States Patent
Spezzani

(10) Patent No.: US 11,090,947 B2
(45) Date of Patent: Aug. 17, 2021

(54) INKJET PRINTING MACHINE ON SLABS

(71) Applicant: KERAGLASS INDUSTRIES S.R.L., Baiso (IT)

(72) Inventor: Stefano Spezzani, Baiso (IT)

(73) Assignee: KERAGLASS INDUSTRIES S.R.L., Baiso (IT)

( * ) Notice: Subject to any disclaimer, the term of this patent is extended or adjusted under 35 U.S.C. 154(b) by 0 days.

(21) Appl. No.: 16/706,971

(22) Filed: Dec. 9, 2019

(65) Prior Publication Data
US 2020/0198376 A1   Jun. 25, 2020

(30) Foreign Application Priority Data

Dec. 19, 2018  (IT) .................. 102018000020215

(51) Int. Cl.
| | | |
|---|---|---|
| *B41J 3/407* | (2006.01) | |
| *B41J 11/04* | (2006.01) | |
| *B41J 11/00* | (2006.01) | |

(52) U.S. Cl.
CPC ........... *B41J 3/407* (2013.01); *B41J 11/0045* (2013.01); *B41J 11/04* (2013.01)

(58) Field of Classification Search
CPC ....................................................... B41J 3/28
See application file for complete search history.

(56) References Cited

U.S. PATENT DOCUMENTS

| | | | | |
|---|---|---|---|---|
| 6,634,729 | B1* | 10/2003 | Schuman | B41J 3/28 347/2 |
| 2004/0212644 | A1* | 10/2004 | Kwag | B41J 25/308 347/8 |
| 2007/0070325 | A1* | 3/2007 | Suyama | H01L 21/67051 355/72 |
| 2009/0007811 | A1* | 1/2009 | Weingartner | B41J 13/28 101/483 |
| 2009/0025587 | A1* | 1/2009 | Verlinden | B41J 3/28 101/232 |
| 2015/0035933 | A1* | 2/2015 | Hoshi | B41J 11/0045 347/215 |
| 2018/0333953 | A1* | 11/2018 | Vazquez | B41J 3/28 |
| 2019/0016160 | A1* | 1/2019 | Fujioka | B41J 3/28 |
| 2019/0030920 | A1* | 1/2019 | Mori | B41J 11/0045 |
| 2019/0299660 | A1* | 10/2019 | Matsunaga | B41J 3/28 |

FOREIGN PATENT DOCUMENTS

| | | |
|---|---|---|
| CN | 105294168 A | 2/2016 |
| CN | 108189564 A | 6/2018 |
| WO | 2005018941 A1 | 3/2005 |
| WO | 2016042496 A1 | 3/2016 |

* cited by examiner

*Primary Examiner* — Shelby L Fidler
(74) *Attorney, Agent, or Firm* — Browdy and Neimark, PLLC

(57) ABSTRACT

An inkjet printing machine on slabs that includes a support for supporting a slab; a locking and centring group configured to contact the slab temporarily locking and centring it on the support; and a printing device provided with at least one inkjet printing head that is mobile with respect to the support along a sliding direction and spaced from it, wherein the printing head is configured to release a decoration on a surface of the slab resting on the support.

19 Claims, 13 Drawing Sheets

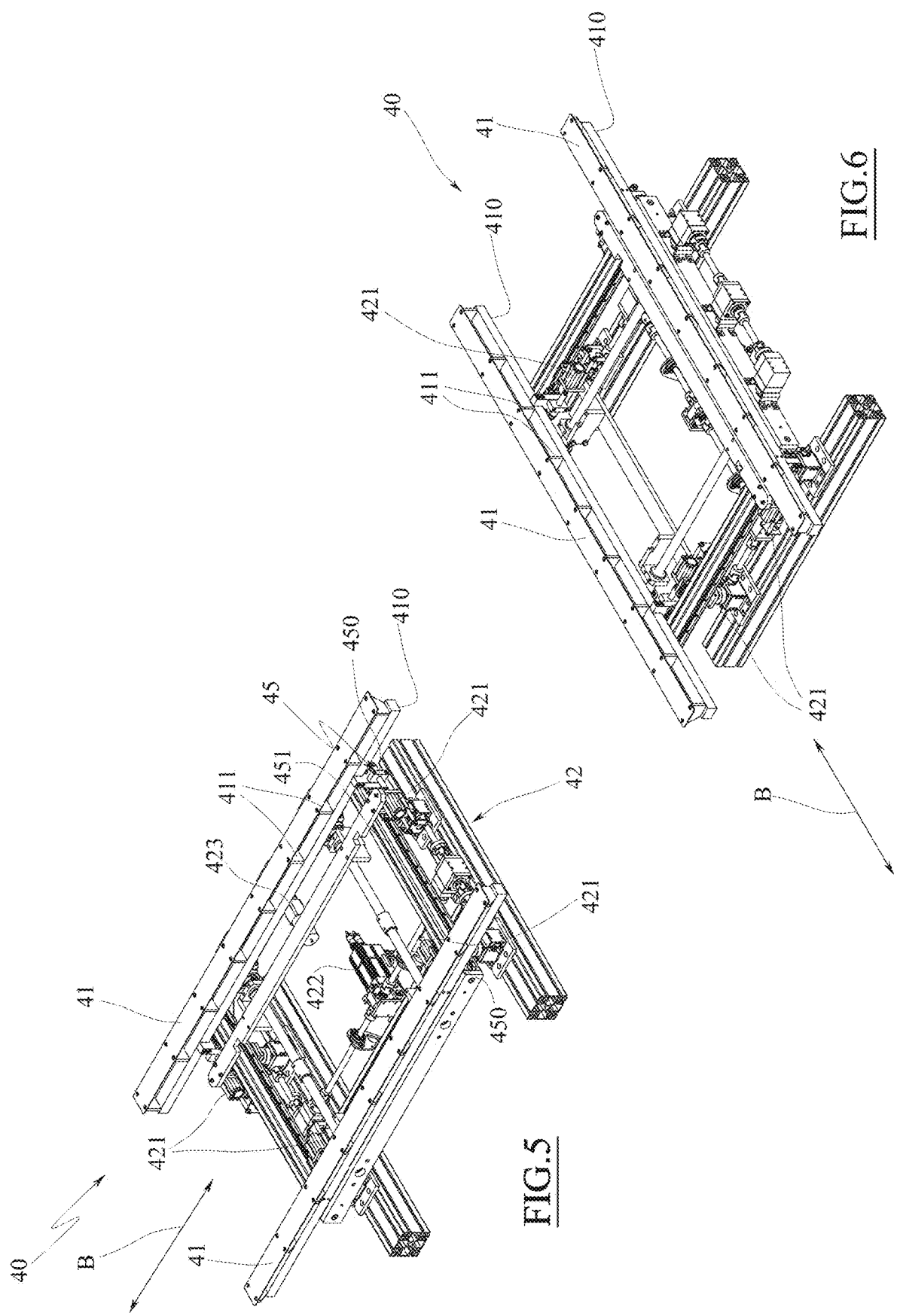

INKJET PRINTING MACHINE ON SLABS

TECHNICAL FIELD

The present invention concerns an inkjet printing machine, for example digital, on rigid slabs, particularly particularly but not for limiting purposes transparent slabs, like glass slabs, or slabs of any kind like slabs of ceramic, of natural stone, of metal or similar.

PRIOR ART

As known, inkjet printing machines for printing on slabs have a conveyor on which a slab with an upward-facing surface to be decorated rests and a printing module equipped with one or more printing heads adapted for being arranged above the slab so as to release a plurality of drops of ink or decoration on the surface to be decorated of the slab itself.

In the field of inkjet printing on slabs, for example rigid slabs, printing machines essentially of two distinct types are known.

A first known type of printing machine provides that the slab advances in steps on the conveyor along an advancing direction and at every step the printing module is made to slide (forwards and backwards) along a direction perpendicular to the advancing direction to release a strip of decoration that covers the entire width of the slab to be decorated on a limited axial segment of the surface to be decorated of the slab. The advancing in steps of the slab under the printing module that slides transversally with respect to the slab makes it possible to decorate the entire length of the slab in steps with consecutive strips of decoration.

A second known type of printing machine, also called single-pass, provides that the slab advances at substantially constant speed on the conveyor along an advancing direction and that the printing module is fixed above the conveyor, for example on a cross-member that engages the entire span thereof, so as to remain stationary.

A drawback encountered in both types of printing machine illustrated above is the fact that the decoration printed through them is not particularly precise. Such a drawback is more evident when transparent slabs are decorated, like glass slabs, the transparency of which make printing defects more evident, which can be essentially due to the micro movements and/or sliding of the slab on the conveyor during the advancing of the same slab, for example between one advancing step of the slab and the next (in the first type of printing machine) or continuous (in the second type of printing machine).

Moreover, a further drawback encountered in so-called single-pass printing machines is that it is practically impossible to carry out two "passes" of ink that can be substantially juxtaposed and, therefore, the printing quality is affected.

A purpose of the present invention is to overcome the aforementioned drawbacks of the prior art, in a simple, rational and low-cost solution.

In particular, a purpose of the present invention is to provide an inkjet printing machine that makes it possible to make a particularly defined and precise decoration, without defects that can be perceived by the naked eye even when the slab is a transparent slab.

Furthermore, a purpose of the present invention is to avoid the contamination or staining of the slab, also of the surface opposite the decorated surface.

Such purposes are accomplished by the characteristics of the invention given in the independent claims. The dependent claims outlined preferred and/or particularly advantageous aspects of the invention.

SUMMARY OF THE INVENTION

The invention, particularly, provides an inkjet printing machine for printing on slabs comprising:
- a support for supporting a slab;
- a locking and centring group configured to contact the slab temporarily locking and centring it on the support; and
- a printing device provided with at least one inkjet printing head that is mobile with respect to the support, for example on it, along a (mutual) sliding direction and arranged spaced from such a support, wherein the printing head is configured to release a decoration on a surface of the slab that is resting on the support.

Thanks to such a solution, during printing by the printing head the slab is held firm on the support and, therefore, the decoration is particularly accurate and precise, in high definition, even for transparent slabs, wherein such a decoration is visible against the light and needs high quality standards.

Moreover, it is possible to decorate the entire surface of the slab effectively with a single pass (like in single-pass machines) or, if it is necessary to use plural passes, the passes after the first are perfectly centred and calibrated with respect to the previous ones.

According to an advantageous aspect of the invention, the support can comprise a horizontal resting plane that comprises an advancing group for advancing the supported slab (resting, preferably directly, on the resting plane) along a predetermined horizontal advancing direction (namely parallel to the resping plane).

Advantageously, the advancing group can comprise (or consist of) a motorised conveyor (such as a belt or blets conveyor or a roller conveyor), for instance a motorised roller conveyor, the rollers of which globally define the resting plane.

Thanks to such a solution, the possibility of dirtying the surface of the slab opposite the surface to be decorated with the printing inks is decreased or minimised, which is particularly useful in use with transparent slabs, wherein possible stains in the surface opposite the surface to be decorated would still be visible in the use of the slab.

Moreover, such an aspect is permitted and/or maximised also by the presence of the locking and centring group (and the configuration thereof which will be described better hereinafter), since it also acts as protection of the resting plane (i.e. of the rollers) from the drops of ink released by the printing device.

Even more advantageously, the rollers can be ceramic rollers, i.e. rollers the outer shell of which consists of an exclusively ceramic shell.

Thanks to such a solution, it is possible to make the rollers inert to heat radiation and other wearing stresses and, therefore, extend the useful life of the support with undoubted advantages in terms of operativity of the printing machine.

According to an aspect of the invention, the locking and centring group can comprise at least one pair of bars mutually mobile on the support and configured to laterally releasably clamp a slab arranged resting on the support.

Thanks to such a solution, the slab is particularly stable and fixed at the moment of deposition of the decoration without interfering with the surface to be decorated. Moreover, thanks to the configuration of the locking and centring group it is possible to obtain an effective locking and centring in a cost-effective and easily adaptable manner to every format of slab.

According to a further aspect of the invention, the locking and centring group comprises at least one front barrier adapted for stopping the advancing of the slab along the advancing direction.

Thanks to such a solution, it is possible to effectively stop the stroke of the slab on the resting plane and, at the same time, define a fixed reference system on the resting plane for the slab itself.

Yet another aspect of the invention provides that the printing device can comprise a group of printing heads side-by-side, offset and/or aligned, along a side-by-side direction and mutually mobile as a unit.

Preferably, the size of the group of printing heads along the side-by-side direction can be at least equal to or greater than a side of the slab to be decorated.

Thanks to such a solution, with a single pass it is possible to deposit a decoration that can occupy the entire (upper) surface of the slab.

According to a first embodiment, the sliding direction of the printing head of the printing device on the support can be horizontal and parallel to the advancing direction.

According to an alternative second embodiment, the sliding direction of the printing head of the printing device on the support can be horizontal and perpendicular to the advancing direction.

Advantageously, the printing device can comprise a heating device mobile on the support and spaced from it along the sliding direction as a unit with the printing head.

Thanks to such a solution it is possible to preheat the surface to be decorated of the slab and/or dry the decoration deposited on the decorated surface of the slab. Advantageously, the heating device can be aligned with the printing head along an alignment direction parallel to a sliding direction and is arranged upstream or downstream of the printing head in a sliding sense of the printing head along the sliding direction.

Furthermore, the heating device can comprise or consist of an infrared lamp.

According to a further advantageous aspect, the printing machine can comprise a measuring group, configured to measure at least one dimension of the slab, for example the width and/or the length of the slab itself.

Thanks to such a solution, it is possible to provide (before printing) a measurement of the real size of the slab to be decorated, i.e. of the actual printing area and consequently to calibrate the printing device so that it can print exactly in such a printing area, in this way optimising the decoration and decreasing the wasting of ink.

Advantageously, the measuring group can be arranged on-board or, in any case, cooperate with the locking and centring group.

For the same purposes outlined above, a further aspect of the invention provides an inkjet printing method on slabs that comprises the steps of:
  supporting a slab on a support;
  temporarily locking the slab on the support through the contact with a locking and centring group that is mobile on the support; and
  releasing a decoration on a surface of the slab by moving an inkjet printing head of a printing device on the slab resting with respect to (and above) the support and spaced from it.

BRIEF DESCRIPTION OF THE DRAWINGS

Further characteristics and advantages of the invention will become clearer from reading the following description provided as an example and not for limiting purposes, with the help of the figures illustrated in the attached tables.

FIG. 5 is a first axonometric view of a centring and locking group of the printing machine according to the invention, both according to the first and the second embodiment.

FIG. 6 is a second axonometric view of a centring and locking group of the printing machine according to the invention, both according to the first and the second embodiment.

BEST EMBODIMENT OF THE INVENTION

Figure 1:
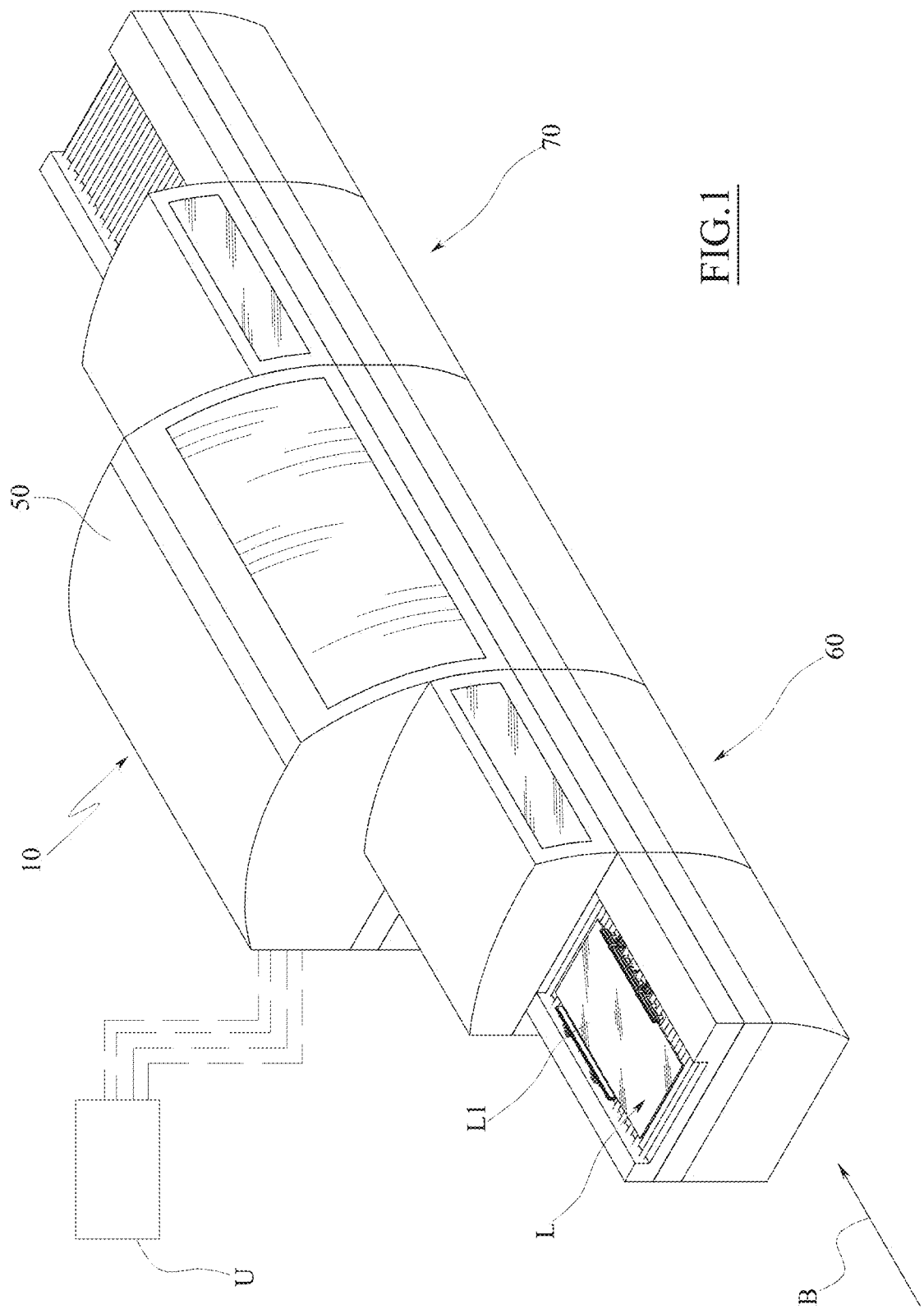
FIG. 1 is an axonometric view of a system for decorating slabs equipped with a printing machine according to the invention.
Figure 2:
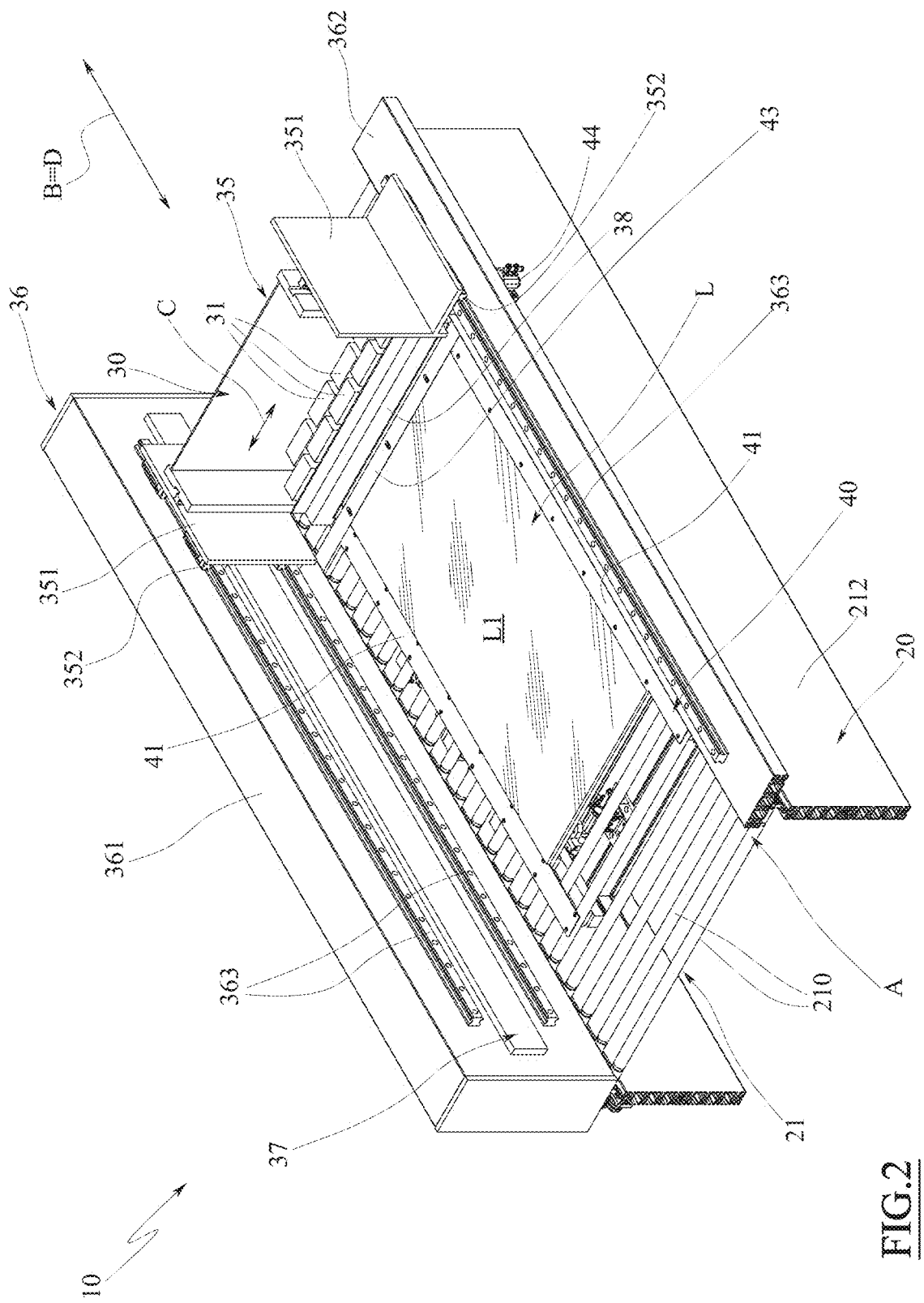
FIG. 2 is an axonometric view of a first embodiment of a printing machine according to the invention, in which the buffer case has been removed for better intelligibility of the figure.
Figure 3:
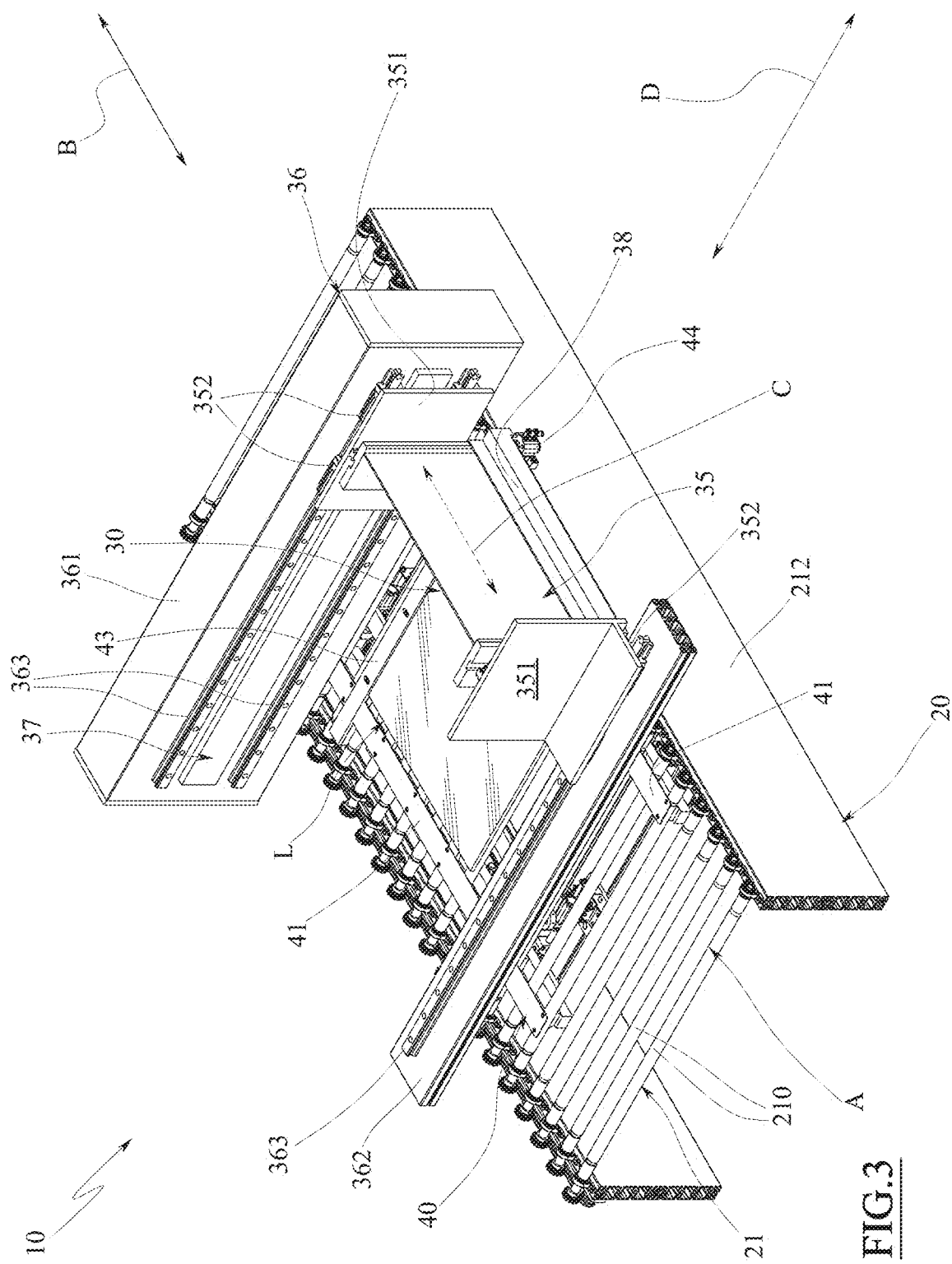
FIG. 3 is an axonometric view of a second embodiment of a printing machine according to the invention, in which the buffer case has been removed for better intelligibility of the figure.

With particular reference to such figures, a system for decorating rigid slabs, particularly but not for limiting purposes optically transparent slabs, like slabs of glass or similar is described, globally indicated with the letter L.

The term slabs L is meant to indicate any sheet-like body of any material, like for example preferably glass and ceramic, but also metal, natural stone or another material suitable for making up the slab.

Moreover, the slab L can be of any shape or size, for example it can be flat or concave, polygonal or rounded or a combination thereof.

The system comprises an inkjet printing machine 10, preferably a digital inkjet printing machine, which is configured to release a decoration on a surface L1 of one or more slabs L.

The printing machine 10 comprises a support 20 for supporting at least one slab L resting on a lower support surface thereof opposite the upper surface L1 to be decorated.

The support 20 comprises a horizontal resting plane A on which the slabs L are intended to rest with their surface L1 to be decorated facing upwards.

The support 20 comprises, preferably, an advancing group for advancing the slab L supported on the resting plane (resting on the resting plane, preferably directly) along a predetermined horizontal advancing direction B (substantially rectilinear).

In the preferred example illustrated, the advancing group comprises a roller conveyor, in particular, the advancing group comprises a roller conveyor 21, which generally provides a plurality of rotating rollers 210 arranged parallel to one another and coplanar to one another to define the aforementioned horizontal resting plane A on which the slabs L to be decorated rest.

In practice, each roller 210 of the roller conveyor 21 rotates around its own horizontal axis and perpendicular to the advancing direction B.

The rollers 210 of the roller conveyor 21 are connected to a motor 211 (see FIG. 4), in particular through transmission members like chains or belts, said motor being adapted for making them rotate on themselves in a synchronous manner so as to make the slabs L advance in the aforementioned horizontal advancing direction B (in one or both the directions of travel).

The rotation speed of the rollers 210 regulates the advancing speed of the slabs L along the advancing direction B, which can be set and adjusted according to the processing requirements.

The roller conveyor 21 is equipped with a frame 212 for resting on the ground, in particular, the roller conveyor 21 is equipped with two side flanks that rest on the ground at their lower end and that rotatably support, at the top thereof, the opposite distal ends of the rollers 210.

The motor 211 for actuating the rollers 210 can be arranged below the rollers themselves between the two side flanks or in another suitable position.

The rollers 210 of the roller conveyor 21 are preferably ceramic rollers, i.e. rollers made (exclusively) from ceramic material, without any rubber coating.

Preferably, the rollers 210 of the roller conveyor 21 have an outer shell, for example substantially impermeable (for example glazed) or almost, which is rigid (i.e. not deformable by the loads to which it is normally subjected during operation), preferably made of ceramic material (preferably, but not for limiting purposes refractory). The roller conveyor 21 can have a main dimension parallel to the advancing direction B set by the rollers 210.

The advancing group, alternatively, could be defined by a conveyor belt, a carriage conveyor or other conveyor of a type known in the field of printing machines.

The printing machine 10 comprises a printing device 30 configured to release a predetermined decoration on the surface L1 (upper) of the slab L.

The printing device 30 is preferably a digital (inkjet) printing device, as will be described better hereinafter.

The term decoration is meant to generally indicate the application of decorative fluids, like dying and/or decorating inks, but also the application of any product in fluid, liquid or semi-solid form, for example functional coatings, coatings, protective or anti-reflection layers or similar.

The printing device 30 comprises at least one inkjet printing head 31, which is equipped with suitable ejector nozzles (not illustrated) of a decorative fluid, like for example an ink, an enamel or similar, to be dispensed onto the surface L1 of the slabs L resting on the resting plane A provided by the roller conveyor 21.

The printing device 30 comprises a plurality of printing heads 31, for example beside one another along a side-by-side direction C.

In the illustrated example, the printing device 30 comprises a plurality of parallel rows (in the example 2 of them) of printing heads 31, each of which consists of a plurality of printing heads 31 beside one another along a side-by-side direction C, which for example are offset from one another.

Globally, the printing head 31 or the group of printing heads 31 has a main dimension (parallel to the side-by-side direction C thereof where there are more than one), which is at least equal to or greater than one of the sides (longer or shorter) of the slab L to be decorated.

For example, the main dimension of the printing head 31 or of the group of printing heads 31 is substantially equal to (or slightly less than) the length of the rollers 210 of the roller conveyor 21.

Each printing head 31 is defined by a block the lower face of which is engaged by the aforementioned ejector nozzles, which thus face downwards so as to be able to dispense drops of ink or other decorative fluid on the underlying surface L1 of the slab L, when suitably actuated through suitable injectors.

The printing heads 31 of the printing device 30 can be of any known type without limitations.

The printing device 30 also comprises a feeding group (per se known) of the decorative fluid to each printing head 31, which communicates with one or more respective tanks in which the decorative fluid itself is contained.

Each feeding group comprises an electronic board, which manages the operation of each printing head 31 and, therefore, the single ejector nozzles (through the=respective injectors).

The decorative fluid dispensed by each printing head 31 can be monochromatic=or polychromatic, for example bichromatic.

The printing device 30 comprises a support trolley 35, which is suspended on the resting plane A of the support 20, a non-zero distance from it, and is mobile parallel to the resting plane A with respect to the support 20 itself.

The support trolley 35 comprises a substantially box-like body.

For example, the support trolley 35 comprises a horizontal lower wall 350, which is parallel to the resting plane A of the support 20 and is arranged a predetermined distance from it (for example adjustable in height through suitable adjustment members, preferably suitably motorised).

The support trolley 35, preferably the lower wall 350, comprises one or more housing seats (for example through openings) in which a respective printing head 31 is received (with its ejector nozzles facing towards the resting plane A and kept a predetermined distance from it).

The support trolley 35 also comprises a pair of opposite flanks 351 rising from the opposite side of the lower wall 350, which are parallel to one another and spaced along the side-by-side direction C so as to contain the entire main dimension of the printing head 31 or of the group of printing heads 31 inside them.

The flanks 351 can be joined by one or more buffer walls for example square with them to define a containment volume of the support trolley 35 in which at least part of the feeding group and/or of the supply tanks of the decorative fluid to the printing heads 31 can be contained.

The support trolley 35 is slidably supported on the resting plane A.

In particular, the support trolley 35 is supported by the frame 212 of the roller conveyor 21, with possibility of sliding along a horizontal sliding direction D, i.e. parallel to (and spaced from) the resting plane A.

The sliding direction D is perpendicular to the side-by-side direction C of the printing heads 31 supported by the support trolley 35.

Preferably, a support structure 36 of the support trolley 35 is rigidly connected, i.e. firmly fixed, to the frame 212 of the roller conveyor 21 above the resting plane A.

The support structure 36 comprises a pair of support walls 361 and 362 spaced apart by a distance equal to or greater than the main dimension of the support trolley 35 (i.e. the lower wall 350 thereof).

The support walls 361 and 362 have longitudinal guides 363 rigidly fixed to them, said guides for example being defined by grooved beams, with horizontal longitudinal axis to which suitable sliding sleds 352 are connected, fixed to the opposite flanks 351 of the support trolley 35.

In particular, the support structure 36 comprises a vertical support walls 361 and a horizontal support wall 362, which are singularly supported by the frame 212 of the roller conveyor 21.

Correspondingly, a sliding sled 352 of the support trolley 35, which is coupled with the longitudinal guide 363 of the vertical support walls 361 is laterally fixed to the outside of one of the flanks 351 of the support trolley 35, and another sliding sled 352 of the support trolley 35, which is coupled with the longitudinal guide 363 of the horizontal support wall 362 is, on the other hand, fixed below the opposite flank 351 of the support trolley 35, for example below a shelf facing towards the outside of the respective flank 351.

The support trolley 35 is actuated to slide along the sliding direction D, in the two sliding directions, by a linear actuator group.

Preferably, but not for limiting purposes, the actuator group comprises (or consists of) a linear motor 37, which is supported by one of the support walls of the support structure 36, preferably by the vertical support walls 361.

The printing device 30 also comprises at least one heating device 38 arranged close to the support 20, distanced from it, and configured to heat the surface L1 of the slab L resting on the resting plane A of the support 20.

The heating device 38 is, preferably, mobile on the resting plane A of the support 20 and a predetermined non-zero distance from it fixedly connected with the printing head 31 or the group of printing heads 31.

In practice, the heating device 38 is slidably associated with the support 20 so as to be able to slide along the aforementioned sliding direction D together with the printing head 31.

In the preferred embodiment, the heating device 38 is supported by the support trolley 35, for example close to the lower wall 350 thereof.

The heating device 38 is, for example, an elongated body with longitudinal axis horizontal and parallel to the side-by-side direction C of the printing heads 31.

For example, the heating device 38 has a length at least equal to or greater than one of the sides (longer or shorter) of the slab L to be decorated, preferably substantially equal to (or slightly less than) the length of the rollers 210 of the roller conveyor 21.

The heating device 38, in practice, is arranged with its longitudinal axis parallel to the side-by-side direction C of the printing heads 31 and spaced from it (for example coplanar with respect to a horizontal plane), actually being aligned with the printing head 31 or with the group of printing heads 31 along an alignment direction parallel to a sliding direction D.

The heating device 38 can be arranged upstream and/or downstream of the printing head 31 or of the group of printing heads 31 in a sliding sense of the printing head 31 (and of the support trolley 35) in the sliding direction D.

In a preferred embodiment, the printing device 30 comprises a pair of heating devices 38, one of which is arranged upstream and the other downstream of the printing head or of the group of printing heads 31 in the sliding sense of the printing head 31 (and of the support trolley 35) in the sliding direction D.

The heating device 38 that is arranged upstream of the printing head 31 acts as preheating element, adapted for preheating the surface L1 of the slab L before the printing head 31 releases the decorative fluid onto it; the heating device 38 that is arranged downstream of the printing head 31 acts as drying element of the decorative fluid deposited by the printing head 31.

Each heating device 38 comprises (or consists of) at least one infrared lamp or many infrared lamps.

In a first embodiment shown in FIGS. 1, 2, 4-10, the sliding direction D of the support trolley 35, i.e. of the printing heads 31 (and of each heating device 38) with respect to the support 20, is parallel to the advancing direction B given to the slabs L by the support itself, i.e. by the rollers 210 of the roller conveyor 21.

In this case, the support walls 361 and 362 and, therefore, the longitudinal guides 363 supported by them, extend parallel to the advancing direction B and, preferably each of them is supported above a respective side flank for resting on the group that defines the frame 212 of the roller conveyor 21.

For example, the distance between the support walls 361 and 362 and, therefore, the longitudinal guides 363 supported by them, is substantially equal to the length of the rollers 210 of the roller conveyor 21.

The support trolley 35 is, therefore, supported above the resting plane A defined by the rollers 210 of the roller conveyor 21, so that the side-by-side direction C of the printing heads 31 is perpendicular to the advancing direction B.

The length of the longitudinal guides 363 (and/or of the support walls 361 and 362) is substantially equal to (or slightly less than) the length of the resting plane A along the advancing direction B.

In practice, the support trolley 35 can slide along the sliding direction D for a sliding stroke (maximum) substantially equal to the length of the resting plane A (defined by the rollers 210 of the roller conveyor 21) along the advancing direction B (which is greater than or equal to a maximum main dimension of the slab L that can be decorated with the printing machine 10).

In this case, the main direction of the printing head 31 or of the group of printing heads 31 is such as to be not less than the side of the slab L perpendicular to the advancing direction B thereof that can be decorated with the printing machine 10.

In a second embodiment shown in FIGS. 1, 3, 4-6, 11-14, the sliding direction D of the support trolley 35, i.e. of the printing heads 31 (and of each heating device 38) with respect to the support 20, is perpendicular to the advancing direction B given to the slabs L by the support itself, i.e. by the rollers 210 of the roller conveyor 21.

In this case, the support walls 361 and 362 and, therefore, the longitudinal guides 363 supported by them, extend longitudinally perpendicular to the advancing direction B and, preferably, each of them is supported on top by both of the side flanks for resting on the ground that defines the frame 212 of the roller conveyor 21, for example in a central area of the longitude of the resting plane A (i.e. of the roller conveyor 21).

For example, the distance between the support walls 361 and 362 and, therefore the longitudinal guides 363 supported by them, is substantially equal to (or less or greater than) the length of the rollers 210 of the roller conveyor 21.

The support trolley 35 is thus supported above the resting plane A defined by the rollers 210 of the roller conveyor 21, so that the side-by-side direction C of the printing heads 31 is parallel to the advancing direction B.

The length of the longitudinal guides 363 (and/or of the support walls 361 and 362) is substantially greater than the width of the resting plane A, i.e. than the length of the rollers 210 of the roller conveyor 21 (but for example less than the length of the resting plane A along the advancing direction B).

In practice, the support trolley 35 can slide along the sliding direction D for a (maximum) sliding stroke substantially greater than the width of the resting plane A, i.e. than the length of the rollers 210 of the roller conveyor 21 (but for example less than the length of the resting plane A along the advancing direction B), which is for example greater than or equal to the side of the slab L perpendicular to the advancing direction B thereof that can be decorated with the printing machine 10).

In this case, the main direction of the printing head 31 or of the group of printing heads 31 is such as to be not less than the side of the slab L parallel to the advancing direction B thereof that can be decorated with the printing machine 10.

The printing machine 10, in both of the embodiments shown, comprises a locking and centring group 40 configured to contact the slab L locking it temporarily, i.e. holding it or stopping the motion thereof given by the advancing group, and centring it on the resting plane A defined by the support 20, for example in a predetermined zero position on the resting plane A.

Figure 4:
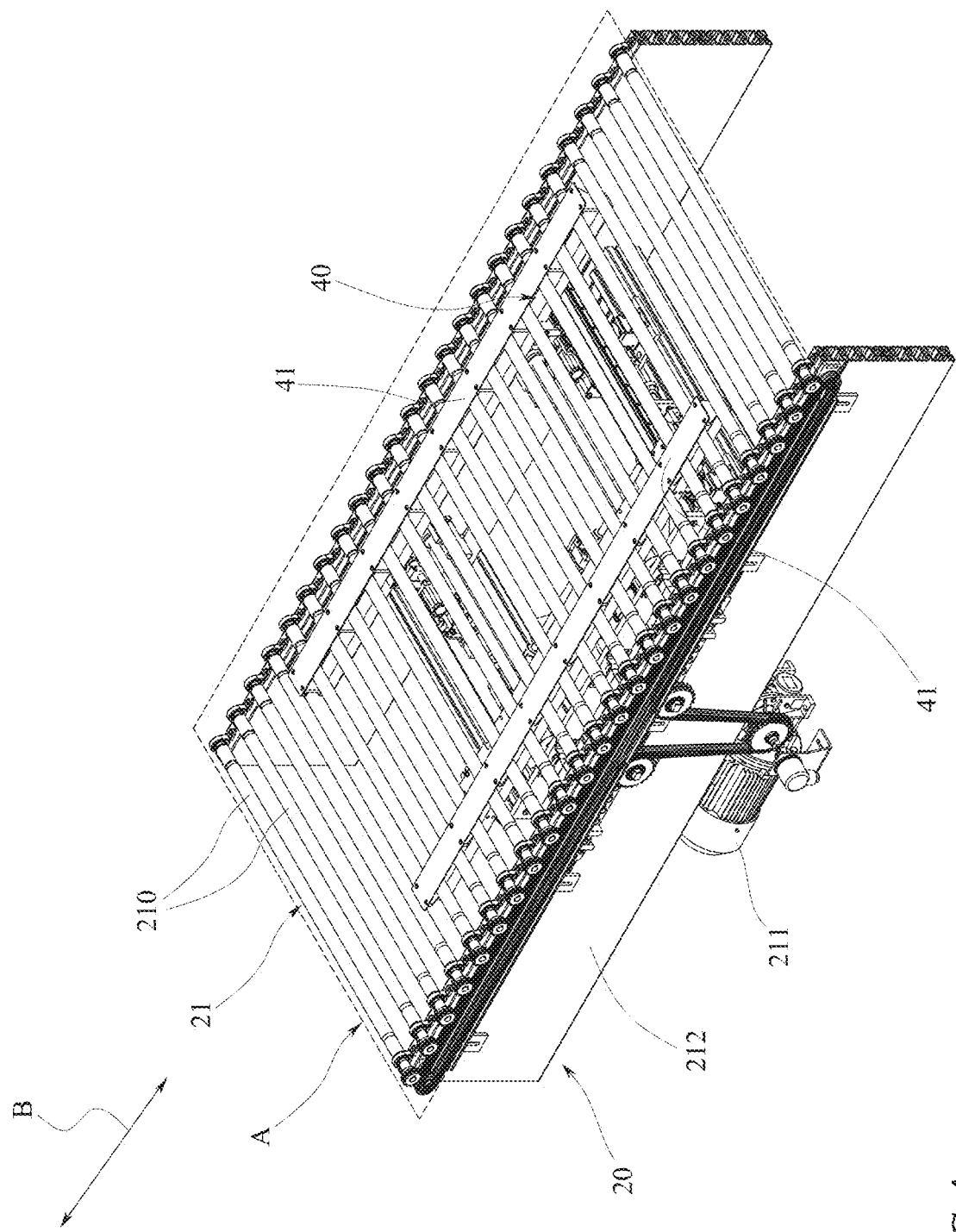
FIG. 4 is an axonometric view of a roller conveyor (equipped with a centring and locking group) of the printing machine according to the invention, both according to the first and the second embodiment.
Figure 7:
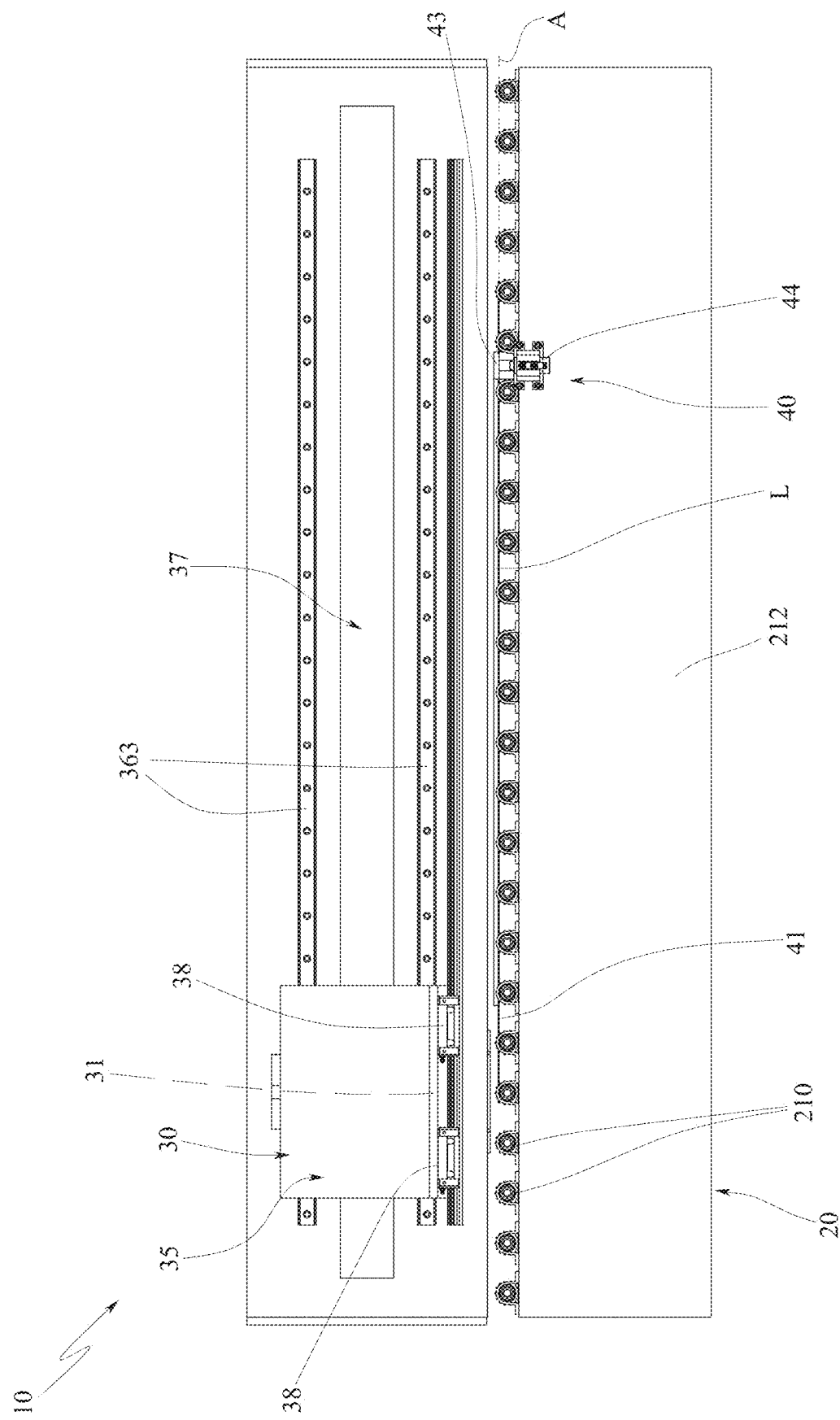
FIG. 7 is a side view of FIG. 2.
Figure 8:
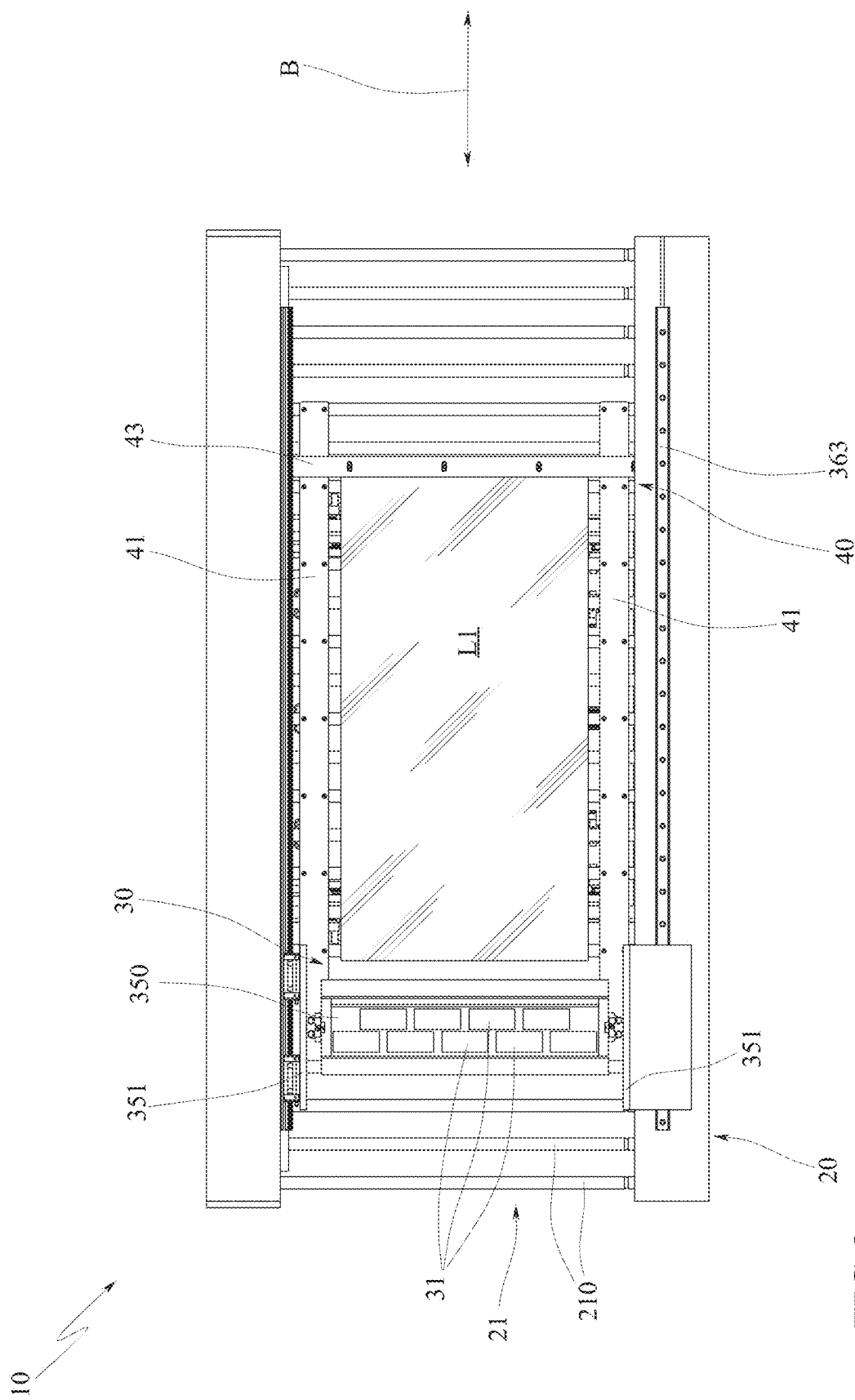
FIG. 8 is a plan view of FIG. 2 in a first operative step of the printing machine.
Figure 9:
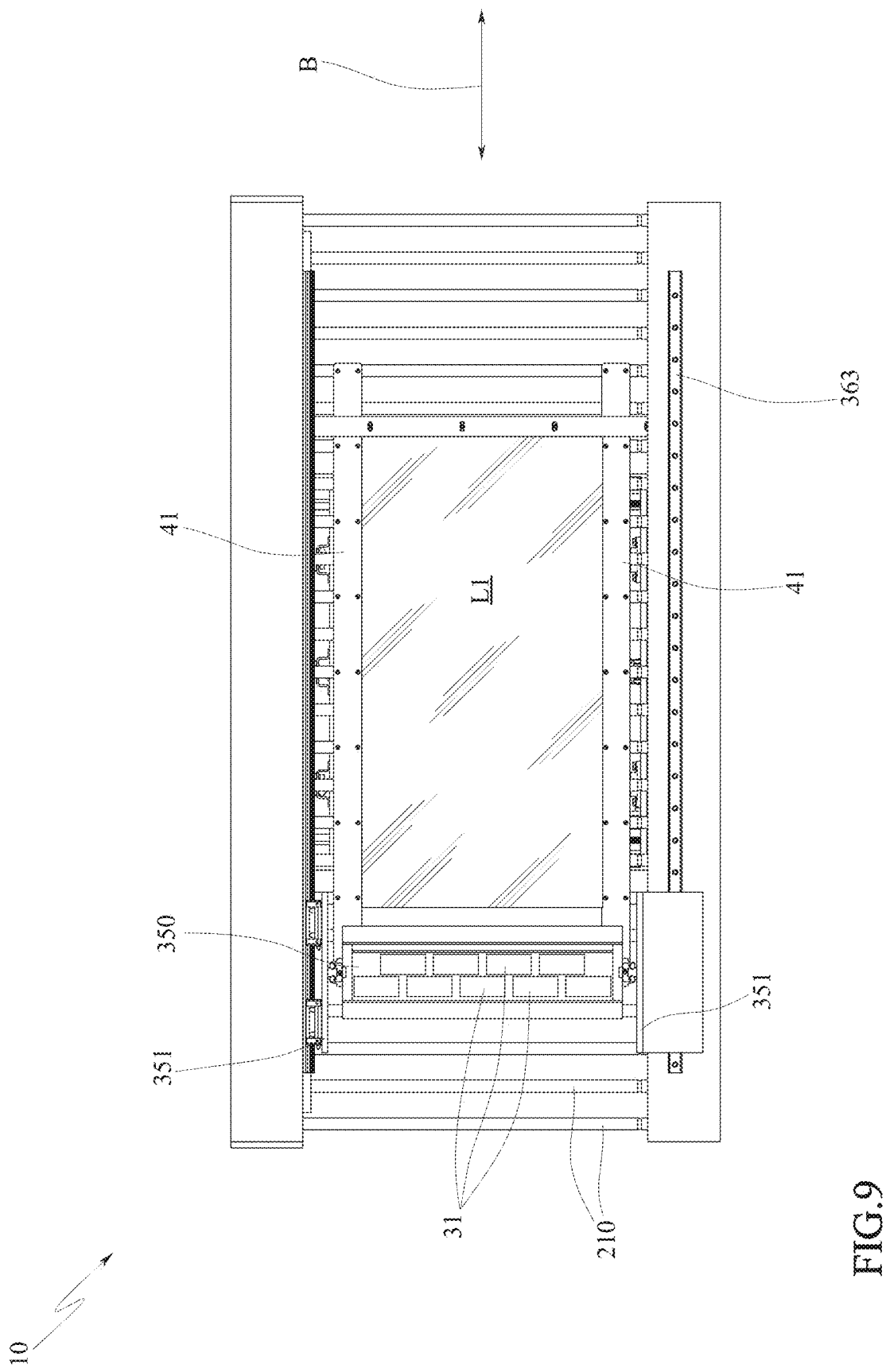
FIG. 9 is a plan view of FIG. 2 in a second operative step of the printing machine.
Figure 10:
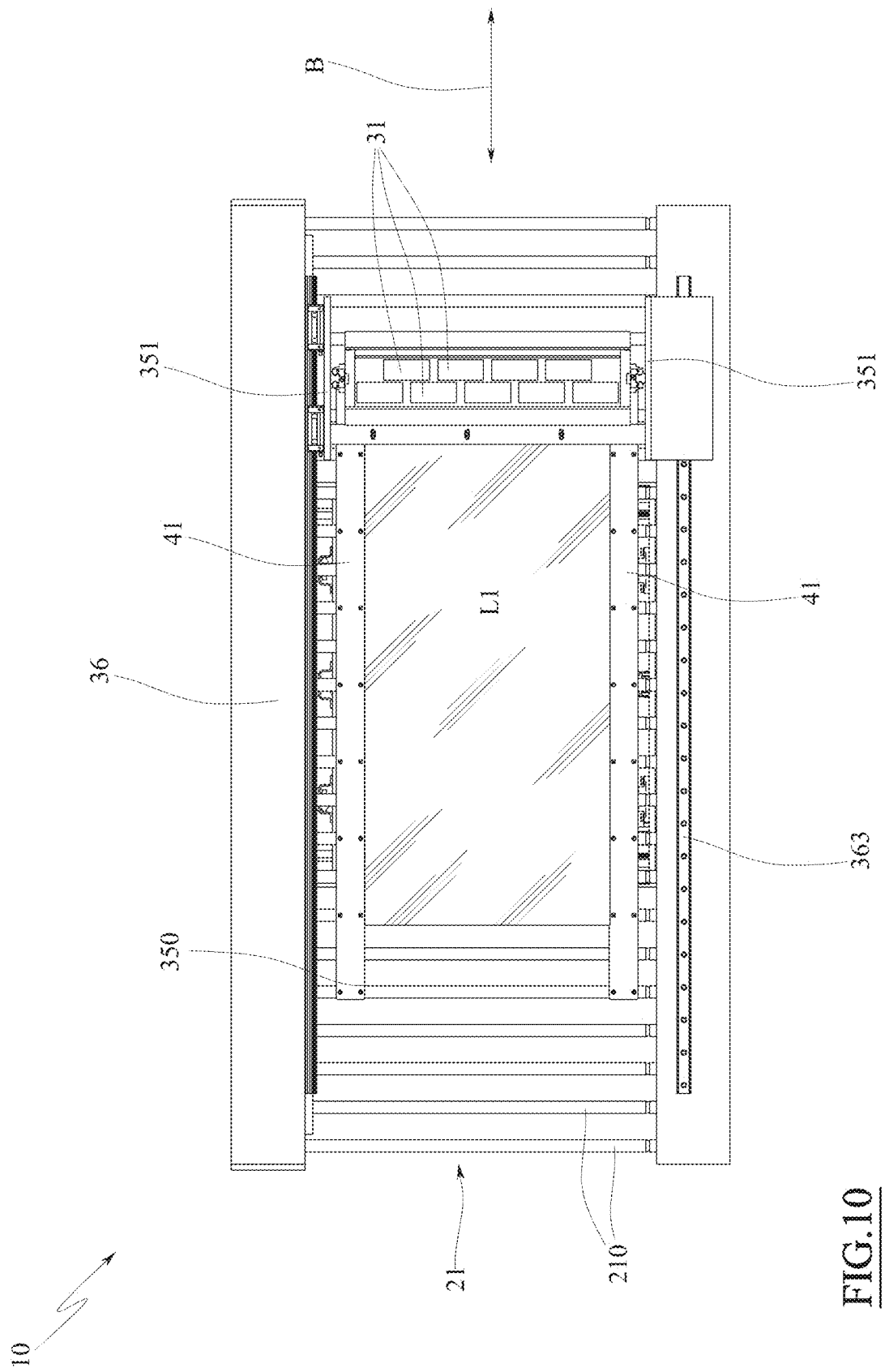
FIG. 10 is a plan view of FIG. 2 in a third operative step of the printing machine.
Figure 11:
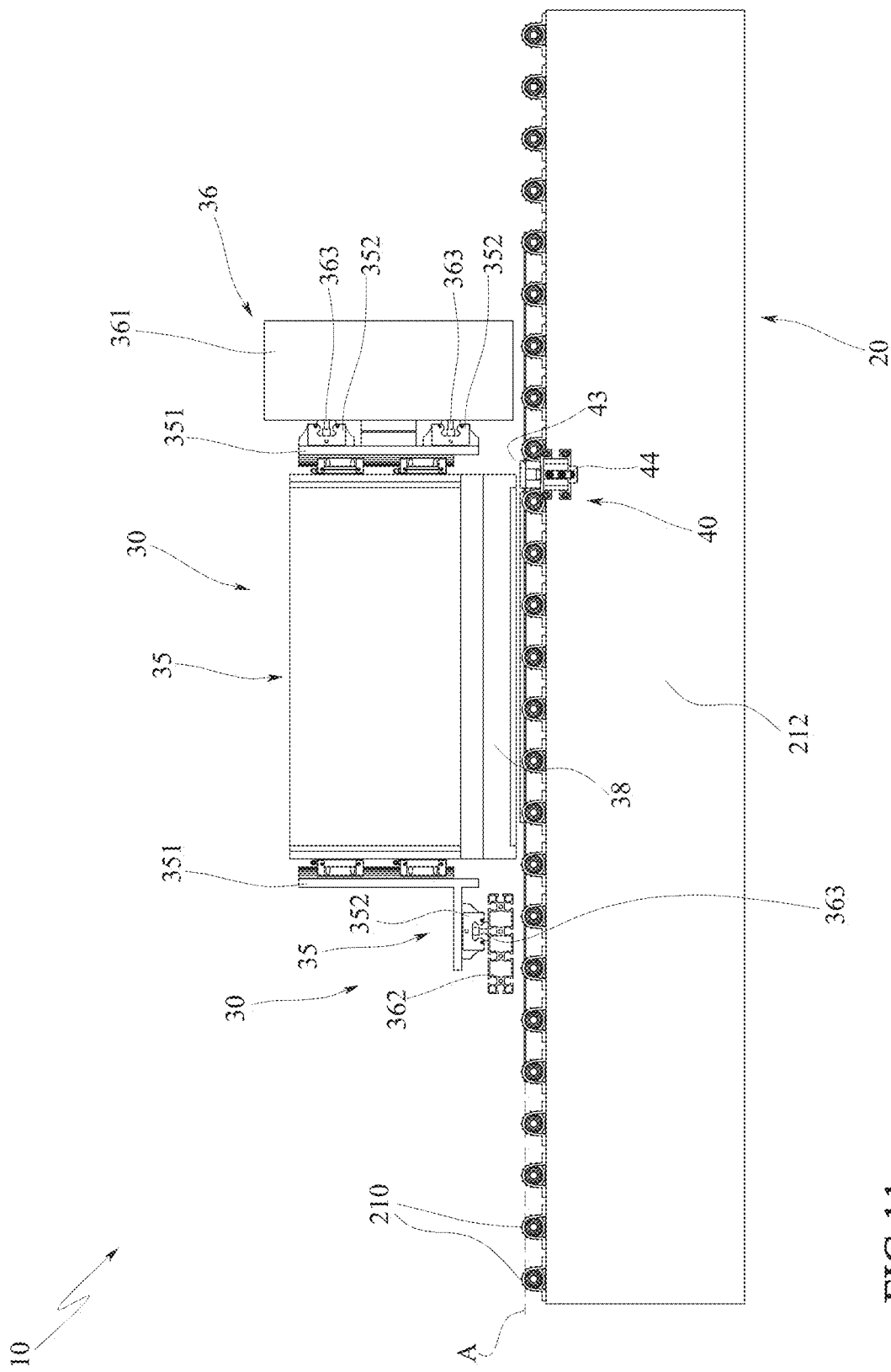
FIG. 11 is a side view of FIG. 3.
Figure 12:
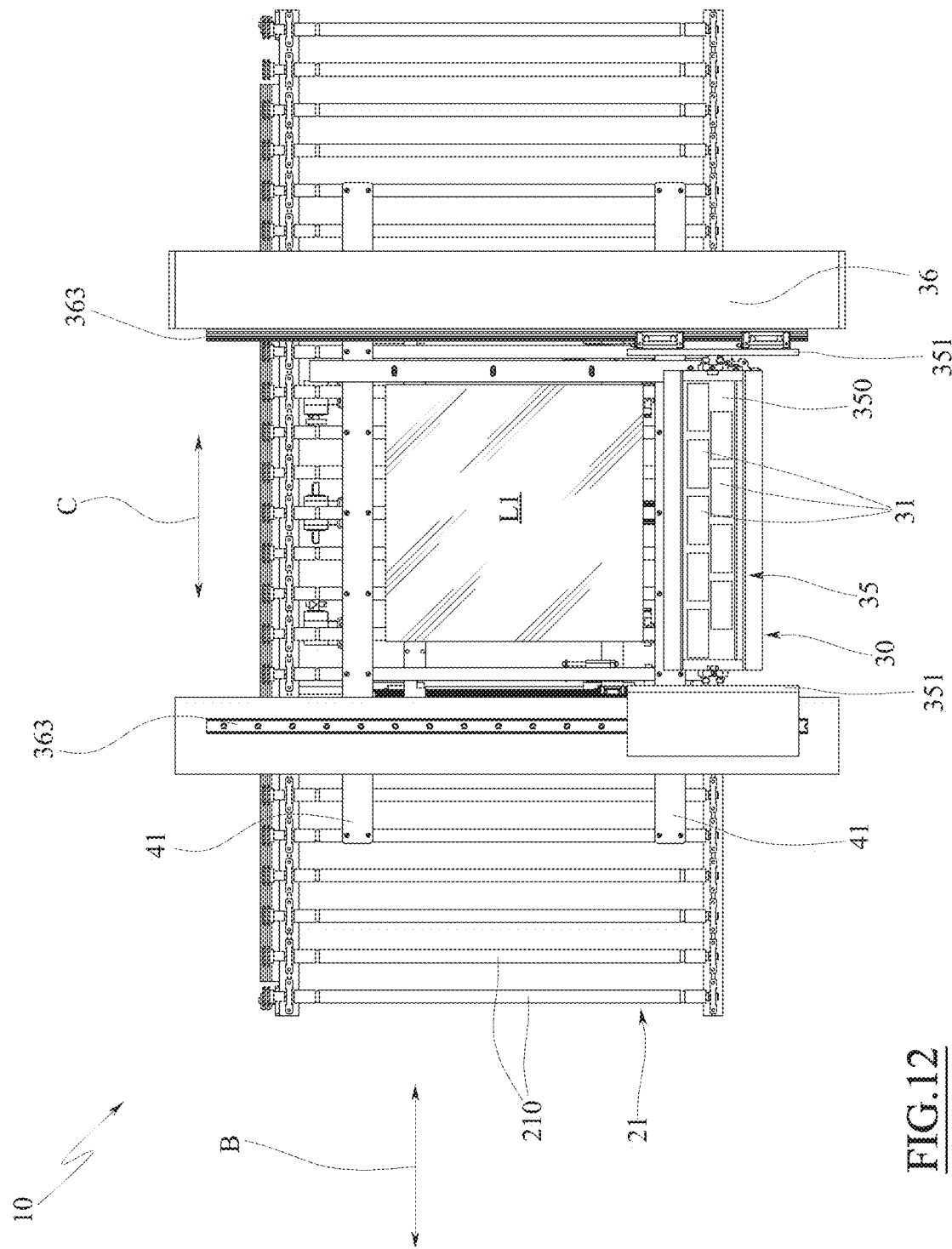
FIG. 12 is a plan view of FIG. 3 in a first operative step of the printing machine.
Figure 13:
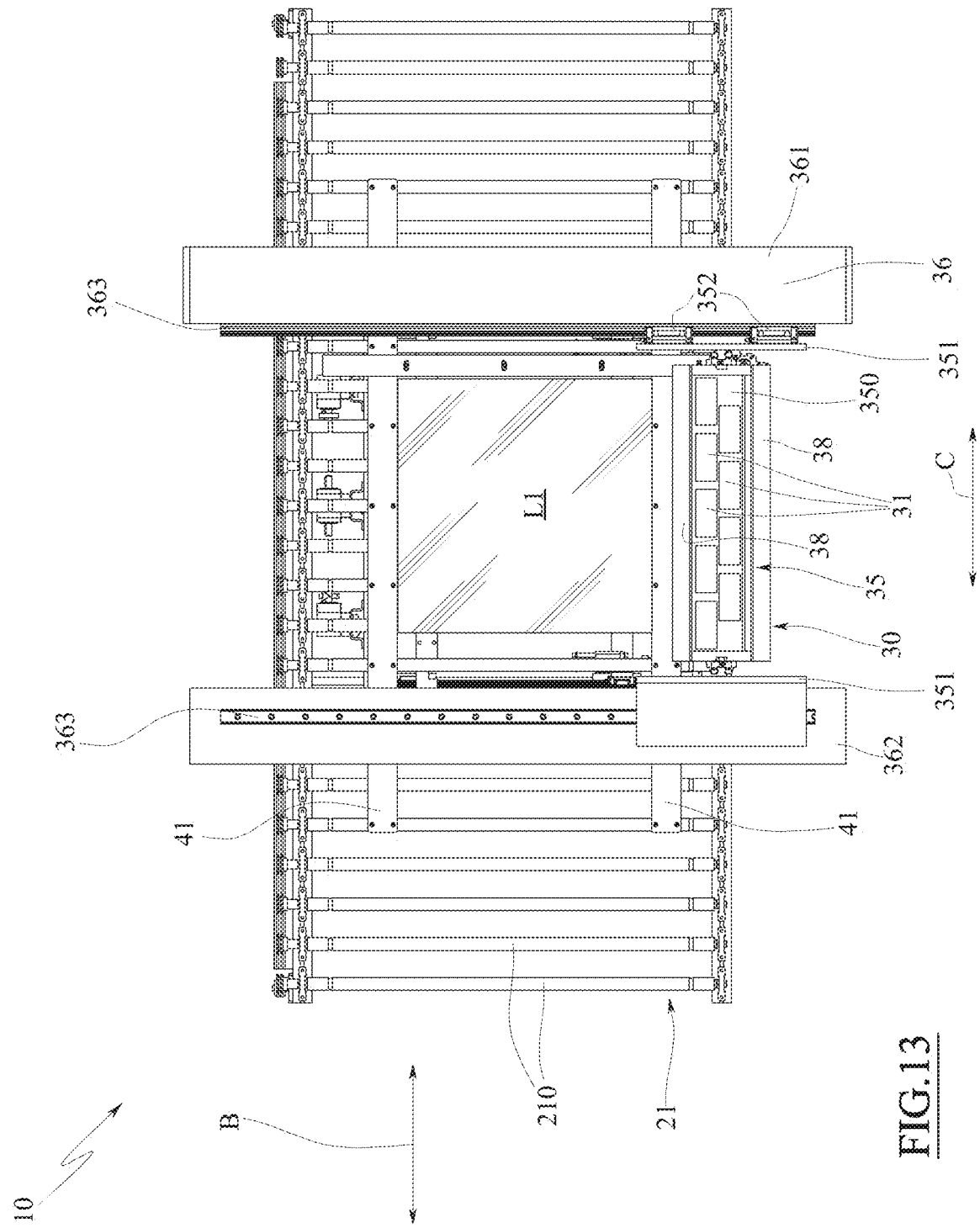
FIG. 13 is a plan view of FIG. 3 in a second operative step of the printing machine.
Figure 14:
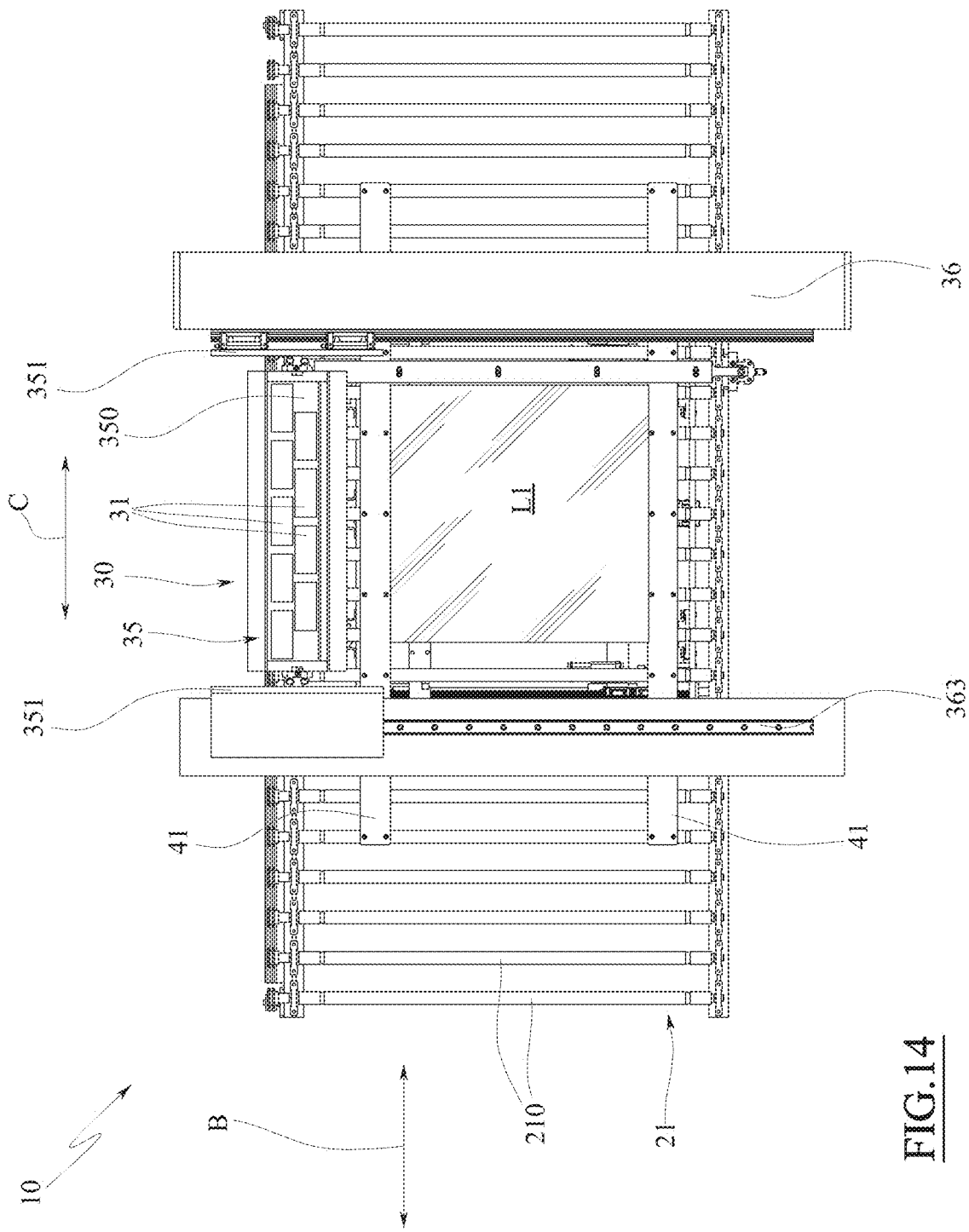
FIG. 14 is a plan view of FIG. 3 in a third operative step of the printing machine.

The locking and centring group 40, which is illustrated in detail in FIGS. 4 and 5, is configured to stop the motion and temporarily lock the advancing of the slab L on the resting plane A (along the advancing direction B), independently from the stopping of the rotation of the rollers 210 of the roller conveyor 21 (although it can be simultaneous).

In practice, the locking and centring group 40 is configured to stop and temporarily lock the slab L on the resting plane A, preventing the slab L from being able to move even accidentally and imperceivably on the resting plane A, for all of the time necessary for the printing heads 31 of the printing device 30 to deposit the decoration on the surface L1 of the slab L itself.

In other words, the locking and centring group 40 is configured to define a (temporary) constraint for the slab L resting on the resting plane A, additional with respect to the constraint defined by the resting plane itself.

The locking and centring group 40 is preferably, but not for limiting purposes, mobile on the support 20, i.e. at least partially above it.

The locking and centring group 40 comprises, in the illustrated example, a pair of bars 41 mutually mobile on the support 20 and configured to releasably laterally clamp the slab L arranged resting on the resting plane A of the support 20.

In practice, the bars 41 are mobile, hung above the resting plane A (flushing with it), with respect to one another along a movement direction perpendicular to the advancing direction B, which is given to the slab L by the rollers 210 of the roller conveyor 21.

In a (preferred) embodiment, both of the bars 41 are mobile with respect to the resting plane A, towards and/or away from each other; however, this does not rule out the possibility that one of the two bars 41 can be fixed onto the resting plane A and the other bar 41 is mobile with respect to such a fixed bar 41.

Each bar 41 is defined by an elongated (and thin) plate-like body, which has a horizontal longitudinal axis parallel to the advancing direction B of the slabs L.

Each bar 41 comprises a vertical inner wall, i.e. facing towards the other bar 41, adapted for defining a contact surface (planar and vertical) with the slab L, i.e. with the opposite side walls of the slab L parallel to the advancing direction B.

The vertical inner wall can, for example, be coated with a gasket or damping element (elastic), like for example a rubber or in any case resilient coating, to soften the mutual contact area between the bar 41 and the slab L.

The bars 41 are mutually mobile between an opened out position, in which the distance apart (i.e. the distance between the two vertical inner walls) is the maximum and is greater than the side of the slab L perpendicular to the advancing direction B thereof that can be decorated with the printing machine 10 (for example it is not less than the main dimension of the printing head 31 or of the group of printing heads 31) and a contracted position, in which the distance apart (i.e. the distance between the two vertical inner walls) is the minimum and is equal to the side of the slab L perpendicular to the advancing direction B thereof that can be decorated with the printing machine 10, i.e. both of the bars 41 are in contact with the slab L resting on the resting plane A.

In practice, when le bars 41 are in their opened out position they allow the slab L to advance on the resting plane A along the advancing direction B, since they do not interfere with it, but when the bars 41 go into their contracted position (and a slab L is arranged between them) they stop the slab L from advancing along the advancing direction B by interference, preventing any relative movement between the slab L and the resting plane A.

The distance of the bars 41 from the resting plane A of the slabs L is no less than the thickness of the slabs L that can be decorated with the printing machine 10.

For example, the distance of the bars 41 from the resting plane A is adjustable as a function of the thickness of the slab L resting on the resting plane A.

For example, the distance of the bars 41 from the resting plane A is such that the bar 41 goes into contact with a central area of the thickness of the slab L.

For example, the distance of the bars 41 from the resting plane A is determined based on the following formula:

$$d=(S-s)/2;$$

wherein d is the distance of the bars 41 from the resting plane A, S is the thickness of the slab L and s is the thickness of the bar 41, where the bar 41 has a smaller thickness than the slab L.

Thanks to such a configuration, where the slab L has chamfered edges (bevels) or rounded edges or similar, the bars 41 can make contact with areas of the side wall of the slab L not engaged by such processing and can still effectively hold the slab L.

Each bar 41 can consist of a plurality of contiguous and/or mutually spaced aligned segments or of a monolithic bar.

In the example, each bar 41 is supported above the resting plane A by a support cross-member 410, which is arranged below the resting plane A, i.e. below the rollers 210 of the roller conveyor 21 (a non-zero distance from them); each support cross-member 410 can be substantially parallel to the respective bar 41 and one or more support columns 411 rise up from it, the base of which is rigidly fixed to the support cross-member 410 and to the top of which the bar 41 is rigidly fixed (for example in a dismountable manner).

Each support column 411 is slotted (with clearance) in an interspace existing between two adjacent rollers 210 of the roller conveyor 21.

The locking and centring group 40 also comprises a first actuation unit 42 configured to actuate the bars 41 in reciprocal motion, as described above, alternately between the opened out position and the contracted position.

The first actuation unit comprises, for example, a first linear actuator 421, for example a pneumatic actuator, having horizontal axis.

In the example, the first actuation unit comprises at least one pair of first linear actuators 421, each of which is associated with a respective bar 41 for the (simultaneous) movement thereof.

Alternatively or in addition, for the fine adjustment of the movement between the opened out position and the contracted position or the centring thereof as a function of the width of the slab L (in the direction perpendicular to the advancing direction B thereof), it is possible to provide for the first actuation unit 42 to be able to comprise a first motor, for example a first rotary motor 423, adapted for horizontally moving a respective bar 41 or, like in the preferred embodiment, (both of) the bars 41.

Moreover, the first actuation unit 42 can be configured to carry out the adjustment of the distance of the bars 41 from the resting plane A.

For this purpose, the first actuation unit 42 can also comprise a second motor, for example a second rotary motor 422, adapted for vertically moving a respective bar 41 or, like in the preferred embodiment, (both of) the bars 41.

The locking and centring group 40 can also comprise a front barrier 43, which is adapted for being arranged on the resting plane A in front of the slab L in the advancing direction thereof (given by the rotation of the rollers 210 of the roller conveyor 21) along the advancing direction B (from an entrance to an exit), so as to contact the front end of the slab L and prevent the slab L from advancing along the advancing direction B itself.

The front barrier 43 is adapted for making contact with a front side wall (in the advancing direction thereof given by the rotation of the rollers 210 of the roller conveyor 21 along the advancing direction B) of the slab L resting on the resting plane A to stop the slab L on the resting plane A.

The front barrier 43 is mobile with respect to the support 20, i.e. with respect to the resting plane A thereof, between a position of non-interference with the slab L, in which it is arranged in a position in which it allows the slab L to pass while advancing along the advancing direction, and an interference position with the slab L, in which it is adapted for making contact with the slab L to stop the movement thereof on the resting plane A.

In particular, the front barrier 43 is slidably mobile along a direction perpendicular to the resting plane A, i.e. vertically, alternately between the aforementioned non-interference position and interference position.

In the illustrated example, in the interference position the front barrier 43 is arranged above the resting plane A, for example a distance from it not greater than the thickness of the slabs L that can be decorated with the printing machine 10.

In the non-interference position the front barrier 43 can be arranged (totally) below the resting plane A, for example retractable inside an interspace existing between two adjacent rollers 210 of the roller conveyor 21.

The front barrier 43 is defined by an elongated (and thin) plate-like body that has a horizontal longitudinal axis perpendicular to the advancing direction B of the slabs L.

The front barrier 43 comprises a rear vertical wall, i.e. facing towards the slab L that enters into the resting plane A in the advancing direction along the advancing direction B, adapted for defining a (flat) contact surface with the slab L, i.e. with the front side wall thereof perpendicular to the advancing direction B, (vertical and) perpendicular to the advancing direction B.

In the illustrated example, the front barrier 43 and the bars 41 intersect, for example close to a downstream end of the bars 41 (in the advancing direction of the slabs in the advancing direction B), but this does not rule out the possibility of the front barrier 43 being arranged at the downstream end of the bars 41 or distal and axially separated from it.

The rear vertical wall can, for example, be coated with a gasket or (elastic) damping element, like a rubber or in any case resilient coating, to soften the area of mutual contact between the front barrier 43 and the slab L.

The locking and centring group 40 also comprises a second actuation unit configured to actuate the front barrier 43 in motion with respect to the resting plane A, as described above, alternately between the non-interference position and the interference position.

The second actuation unit comprises, for example, a second linear actuator 44, for example a pneumatic actuator, with vertical axis.

According to an advantageous aspect of the invention, the printing machine 10 comprises a measuring group 45, which is configured to measure at least one parameter indicative of a dimension, for example a width and/or a length, of the slab L arranged on the resting plane A, i.e. arranged on the rollers 210 of the roller conveyor 21 of the printing machine 10.

In particular, the measuring group 45 is configured to measure the width (dimension parallel to the rotation axis of the rollers 210, i.e. horizontal and perpendicular to the advancing direction B) and/or the exact length (dimension perpendicular to the rotation axis of the rollers 210, i.e. horizontal and parallel to the advancing direction B) of the slab L.

The measuring group 45 comprises at least one sensor element configured to detect and determine the position of two (parallel) opposite vertical walls of the slab L, for example with respect to a reference system (x,y) on the resting plane A or relative between them.

The measuring group 45 is defined integral or on-board the locking and centring group 40.

In practice, the measuring group 45 is configured to determine the (mutual) position of two (parallel) opposite vertical walls of the slab L, i.e. the width and/or the length of the slab L, as an indirect measurement between two or more elements of the locking and centring group 40.

For example, in order to detect the width of the slab L, the sensor element is configured to detect and measure the mutual distance between the bars 41 when they are in their contracted position, i.e. they clamp the slab L.

As stated, when the bars 41 are indeed in their contracted position with the slab L arranged between them, the distance between the bars 41 is the minimum and corresponds to the dimension of the width of the slab L, i.e. to the dimension of the side of the slab L perpendicular to the advancing direction B.

For such purposes, the sensor element could provide a position transducer 450 (as can be seen in FIG. 5), for example a magnetic band position transducer, which is fixed to one of the bars 41, for example it is fixedly connected with it in the sliding carried out by the bar 41 between the opened out position and the contracted position.

Preferably, each bar 41 leads (or is connected) to a respective position transducer 450.

The position transducer 450 is configured to determine an (absolute) position of the respective bar 41 (i.e. of the respective inner vertical wall).

Each position transducer 450 is for example fixed below the resting plane A, for example it is rigidly fixed (below) to the support cross-member 410 of the respective bar 41.

For example, the sensor element also comprises a magnetic band 451, for example longitudinal and having a longitudinal axis parallel to the rotation axis of the rollers 210, i.e. horizontal and perpendicular to the advancing direction B), which is fixed (i.e. stationary) with respect to the resting plane A, for example fixed below it (beneath the rollers 210) on a fixed beam at the frame 212 of the roller conveyor 21.

Each position transducer 450 (singularly) is configured to determine a position of the bar 41 as a function of a variation of a position thereof with respect to (and along) the magnetic band 451.

As an alternative to what is described above it is possible to provide other measuring means, like for example optical groups or position transducers connected to the motors of the bars 41, like encoders or similar.

Moreover, in order to detect the length of the slab L, the sensor element can be configured to detect and measure the distance apart between the front barrier 43 (when the vertical face thereof is in contact with the front side wall of the slab L) and the (free) rear side wall of the same slab.

For these purposes, the sensor element could provide a rear optical group that is not illustrated (for example comprising a series of photocells or a video camera or other), which is for example fixed to the frame 212.

The rear optical group is configured to measure or determine the position (along the advancing direction B of the (free) rear side wall of the slab L with respect to the (axially fixed) position of the front barrier 43 (i.e. the vertical face thereof in contact with the front side wall of the slab L) and, therefore, to determine the length of the slab L as a function of said measured or determined position.

The printing machine 10 also comprises a buffer case 50 (visible only in FIG. 1), which is closed to contain the support 20, the printing device 30 and the locking and centring group 40 and is openable, with suitable hatches, to inspect the content thereof.

Moreover, the buffer case 50 is equipped with at least one optically transparent window for inspecting and checking the content and the printing process carried out by the printing machine 10.

For example, the buffer case 50 encloses an (internal) environment of the printing machine 10, which can preferably be a controlled environment, for example climate-controlled, wherein the parameters of the air arranged inside are monitored and controlled.

In particular, the printing machine 10 comprises means adapted for controlling the climate inside the buffer case 50 and a control group adapted for monitoring and controlling the parameters of the air inside the buffer case 50 to optimise the printing operations.

The printing machine 10 also comprises an electronic control unit U (illustrated only schematically in FIG. 1), which is configured to manage the work steps of the printing machine 10 in an automated manner.

The electronic control unit U, for example, is operatively connected to the motor 211 of the roller conveyor 21 and/or to the injectors of the printing head 31 and/or to the linear motor 37 and/or to the first actuation unit 42 (i.e. to the first linear actuator 421, to the first rotary motor 423 and/or to the second rotary motor 422) and/or to the second linear actuator 44 for managing and controlling the automated operation of the printing machine 10.

The electronic control unit U can also be operatively connected to the measuring group 45.

In this case, the electronic control unit U can be configured to determine or measure at least one (real) dimension of the slab L (arranged in the printing machine 10) and determine or vary the decoration to be printed with the printing head 31 (i.e. vary the actuation of the printing head 31) as a function of the determined or measured dimension, in order to optimise the deposition of the printing ink (only) on the surface L1 of the slab L without going outside of it).

With particular reference to FIG. 1, the system, in addition to what has been described above, could also include a preheating device 60 configured to preheat (up to a predetermined temperature) the surface L1 of the slabs L before they are introduced into the printing machine 10.

For example, the preheating device 60 is arranged upstream of the printing machine 10 in the advancing direction of the slabs L along the advancing direction B given by the roller conveyor 21 of the printing machine 10.

The preheating device 60 (per se known by those skilled in the art) is, for example, equipped with a suitable entry roller conveyor coplanar to the roller conveyor 21 of the printing machine 10.

Furthermore, in addition to what is described above, the system could also include a drying device 70 configured to heat (up to a predetermined temperature) the surface L1 of the slabs L and dry the decorative fluid after it has been deposited by the printing machine 10.

For example, the drying device 70 is arranged downstream of the printing machine 10 in the advancing direction of the slabs L along the advancing direction B given by the roller conveyor 21 of the printing machine 10.

The drying device 70 (per se known by those skilled in the art) is, for example, equipped with a suitable exit roller conveyor coplanar to the roller conveyor 21 of the printing machine 10.

In light of what is described above, the operation (automatically managed and controlled by the electronic control unit U) of the printing machine 10 is as follows.

A slab L to be decorated is advanced on a transportation line with its surface L1 to be decorated facing upwards (see FIG. 1).

The slab L, thus arranged and possibly preheated, enters into the printing machine 10 (see FIGS. 7-8 and 11-12), i.e. it is received by the resting plane A, for instance defined by the rollers 210 of the roller conveyor 21, and made to advance by it (or them) along the advancing direction B.

Preferably, when the slab L enters into the printing machine 10 the front barrier 43 is taken into its interference position (and the bars 41 are in their opened out position).

In this way, when the slab L reaches the front barrier 43 it stops the advancing of the slab L, which will be stopped in a predetermined axial zero position thereof along the advancing direction B (see FIGS. 7-8 and 11-12).

At this point the bars 41, the non-interference position of which had been previously calibrated with the second rotary motor 422 and the distance of which from the resting plane A had been previously adjusted through the first rotary motor 423), can be thus actuated (through the first linear actuator 421) from the opened out position to be taken into their contracted position (see FIGS. 9 and 13), in this way the slab L is firmly held and locked (stopped) with respect to the resting plane A.

Moreover, the bars 41 in the contracted position are such as to lock the slab L in a predetermined transversal zero position thereof along the direction perpendicular to the advancing direction B, which preferably but not for limiting purposes corresponds to the position in which the slab L has a vertical mid-plane substantially coinciding with the vertical mid-plane of the rollers 210 of the roller conveyor 21.

At the same time or after the actuation of the bars 41 the rotation of the rollers 210 of the roller conveyor 21 can be stopped, stopping the motor 211.

With the slab L thus firmly stopped and centred on the resting plane A, the printing machine 10 is configured to be able to actuate the printing device 30, so as to decorate—according to a predetermined decoration—the surface L1 of the slab L. In particular, the printing device 30 is actuated, through the linear motor 37, so that the support trolley 35 slides along the sliding direction D, for example in a first sliding sense (see the support trolley in an end stop position in FIGS. 10 and 14).

With the support trolley 35, therefore, the group of printing heads 31 slides along such a sliding direction D releasing a predetermined decoration on the surface L1 of the slab L.

For example, it is possible, with a single outward stroke (or pass) in the first sliding sense, for the group of printing heads 31 to deposit the entire decoration (and decorate the entire surface L1 of the slab L or in any case the entire area thereof that houses the entire decoration that constitutes the decoration of the slab L).

Alternatively or in addition, it is possible, with a plurality of outward and/or return strokes (or passes), in the first sliding sense and in the opposite second sliding sense, for the group of printing heads 31 to deposit the entire decoration (and decorate the entire surface L1 of the slab L or in any case the entire area thereof that houses the entire decoration that constitutes the decoration of the slab L).

Since the slab L is completely stopped by the locking and centring group 40 on the resting plane A defined by the roller conveyor 21, the printing device 30 deposits the drops of decorative fluid with extreme precision in the position predetermined by the decoration pattern (also in multiple passes).

In order to facilitate the deposition of the decoration, it is possible to actuate the heating device 38, i.e. both of the heating devices 38, so as to effectively preheat the surface L1 before the deposition of the decorative fluid and/or dry the decorative fluid as soon as it has been deposited on the preheated surface L1.

Once the deposition of the decoration on the surface L1 of the slab L has ended, i.e. at the end of one or more passes of the group of printing heads 31 on the surface L1, it is sufficient for the bars 41 to be taken back into their opened out position and the front barrier 43 into its non-interference position and, by selling the rollers 210 of the roller conveyor 21 in rotation it is possible to make the slab L, thus freed and decorated, advance towards the next processing station of the system.

In the case in which it is wished to use the printing machine 10 as a single-pass machine it is sufficient to disinhibit the locking and centring group 40, i.e. leave the bars 41 in the opened out position and the front barrier 43 in the non-interference position, and while the slab L crosses the roller conveyor 21 in the advancing direction B the printing device 30, stationary on the resting plane A, releases the decoration on the (entire) surface L1 of the slab L in a single pass.

The invention thus conceived can undergo numerous modifications and variants all of which are covered by the inventive concept.

Moreover, it is possible to obtain protection on aspects linked to the printing machine 10 independently from the locking and centring group 40 described above, and for example able to be used as single-pass machine or in other operative modes.

Moreover, all of the details can be replaced by other technically equivalent elements.

In practice, the materials used, as well as the contingent shapes and sizes, can be whatever according to the requirements without for this reason departing from the scope of protection of the following claims.

REFERENCE NUMERALS

| | |
|---|---|
| slab L | horizontal support wall 362 |
| surface L1 | longitudinal guides 383 |
| printing machine 10 | linear motor 37 |
| support 20 | heating device 38 |
| resting plane A | locking and centring group 40 |
| advancing direction B | bars 41 |
| roller conveyor 21 | support cross-member 410 |
| rollers 210 | support columns 411 |
| motor 211 | first actuation unit 42 |
| frame 212 | first linear actuator 421 |
| printing device 30 | first rotary motor 423 |
| printing head 31 | second rotary motor 422 |
| side-by-side direction C | front barrier 43 |
| support trolley 35 | second linear actuator 44 |
| lower wall 350 | buffer case 50 |
| flanks 351 | electronic control unit U |
| sliding sleds 352 | preheating device 60 |
| sliding direction D | drying device 70 |
| support structure 36 | |
| vertical support walls 361 | |

The invention claimed is:

1. An inkjet printing machine for printing on slabs comprising:
   a support for supporting a slab;
   a locking and centring group configured to contact the slab temporarily locking and centring it on the support; and
   a printing device provided with at least one inkjet printing head mobile with respect to the support along a sliding direction and spaced from it, wherein the printing head is configured to release a decoration on a surface of the slab resting on the support; and
   a measuring group, configured to measure at least one dimension of the slab, wherein the measuring group is defined integral with or on-board the locking and centering group.

2. The printing machine according to claim 1, wherein the support comprises a horizontal resting plane that comprises an advancing group for advancing the supported slab along a predetermined horizontal advancing direction.

3. The printing machine according to claim 2, wherein the advancing group comprises a motorised roller conveyor, wherein rollers of the roller conveyor globally define the resting plane-.

4. The printing machine according to claim 3, wherein the rollers are ceramic rollers.

5. The printing machine according to claim 2, wherein the locking and centring group comprises at least one front barrier adapted for stopping the slab from advancing along the advancing direction.

6. The printing machine according to claim 5, wherein the measuring group comprises a further sensor configured to detect the length of the slab by detecting and measuring a distance between the front barrier and a rear side wall of the slab, when the front barrier stops the slab.

7. The printing machine according to claim 2, wherein the sliding direction of the printing head of the printing device on the support is horizontal and parallel to the advancing direction.

8. The printing machine according to claim 2, wherein the sliding direction of the printing head of the printing device on the support is horizontal and perpendicular to the advancing direction.

9. The printing machine according to claim 1, wherein the locking and centring group comprises at least one pair of bars (41) mutually mobile on the support and configured to releasably laterally clamp a slab arranged resting on the support.

10. The printing machine according to claim 9, wherein the measuring group comprises a sensor configured to determine the width of the slab by measuring the mutual distance between the bars when the bars clamp the slab.

11. The printing machine according to claim 10, wherein the sensor comprise a position transducer fixed to one or each of the bars.

12. The printing machine according to claim 11, wherein the position transducer is configured to determine an absolute position of the respective bar.

13. The printing machine according to claim 1, wherein the printing device comprises a group of printing heads beside one another, offset and/or aligned, along a side-by-side direction and mutually mobile as a unit.

14. The printing machine according to claim 13, wherein the size of the group of printing heads along the side-by-side direction is at least equal to or greater than a side of the slab to be decorated.

15. The printing machine according to claim 1, wherein the printing device comprises a heating device that is mobile on the support and spaced from it along the sliding direction as a unit with the printing head.

16. The printing machine according to claim 15, wherein the heating device is aligned with the printing head along an alignment direction parallel to a sliding direction and is arranged upstream or downstream of the printing head in a sliding sense of the printing head along the sliding direction.

17. The printing machine according to claim 15, wherein the heating device comprises at least one infrared lamp.

18. The printing machine according to claim 1, wherein the measuring group is configured to measure the at least one dimension of the slab by an indirect measurement of a distance between two elements of the locking and centering group or one element of the locking and centering group and a side of the slab.

19. An inkjet printing method on slabs that comprises the steps of:
supporting a slab on a support;
centering and temporarily locking the slab on the support (20) through the contact with a locking and centring group that is mobile on the support;
measuring at least one dimension of the slab by an indirect measurement of a distance between two elements of the locking and centering group or one element of the locking and centering group and a side of the slab; and
releasing a decoration on a surface of the slab by moving an inkjet printing head of a printing device with respect to the slab resting on the support and spaced from it.

* * * * *